(12) United States Patent
Nada

(10) Patent No.: US 6,898,494 B2
(45) Date of Patent: May 24, 2005

(54) ABNORMALITY DIAGNOSTIC SYSTEM AND ABNORMALITY DIAGNOSTIC DATA STORING METHOD

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/845,179

(22) Filed: May 1, 2001

(65) Prior Publication Data

US 2002/0002430 A1 Jan. 3, 2002

(30) Foreign Application Priority Data

May 1, 2000 (JP) ........................................ 2000-132554

(51) Int. Cl.[7] ........................ G01M 15/00; F02D 45/00; G06F 17/00
(52) U.S. Cl. ............................. 701/35; 701/29; 714/42
(58) Field of Search ........................... 701/29, 35, 43; 700/79, 26, 27, 81; 714/1, 42, 736, 737; 702/182, 183, 185

(56) References Cited

U.S. PATENT DOCUMENTS

| 4,128,005 A | * | 12/1978 | Arnston et al. ............. 73/117.3 |
| 4,373,186 A | * | 2/1983 | Marshall et al. ............. 364/551 |
| 5,034,894 A | | 7/1991 | Abe |
| 5,067,099 A | * | 11/1991 | McCown et al. ........... 364/550 |
| 5,111,686 A | * | 5/1992 | Kamiya et al. ............. 73/117.3 |
| 5,255,208 A | * | 10/1993 | Thakore et al. ......... 364/551.01 |
| 5,491,631 A | * | 2/1996 | Shirane et al. ......... 364/424.04 |
| 5,506,773 A | * | 4/1996 | Takaba et al. ................. 701/29 |
| 5,590,040 A | * | 12/1996 | Abe et al. ...................... 701/35 |
| 5,980,081 A | * | 11/1999 | Watari et al. ................ 364/184 |

FOREIGN PATENT DOCUMENTS

| DE | 40 40 927 | 6/1992 |
| DE | 41 18 692 | 12/1992 |
| EP | 0 646 713 | 4/1995 |
| JP | 03092564 A | 4/1991 |
| JP | 05171998 A | 7/1993 |
| JP | 06066198 A | 3/1994 |

* cited by examiner

Primary Examiner—Thomas G. Black
Assistant Examiner—Dalena Tran
(74) Attorney, Agent, or Firm—Oblon, Spivak, McClelland, Maier & Neustadt, P.C.

(57) ABSTRACT

An abnormality judging section detects the occurrence of an abnormality based on various signals input to a master control CPU, and judges that abnormal event. A data selecting section selects inherent data which is inherent to the abnormal event in accordance with the judged abnormal event from data input to the master control CPU and data generated in the master control CPU. A writing section writes the freeze-frame data to an EEPROM together with nine common data irrespective of a difference in abnormal events. A reading section reads desired freeze-frame data from data stored in the EEPROM in accordance with a request from a diag tester.

51 Claims, 9 Drawing Sheets

← COMMON DATA SECTION → ← INHERENT DATA SECTION →

FIG. 6B

| FRAME1 | αt1 | βt1 | γt1 | at1 | bt1 | ct1 | dt1 |
|---|---|---|---|---|---|---|---|
|  |  |  |  |  |  |  |  |
|  |  |  |  |  |  |  |  |
|  |  |  |  |  |  |  |  |

FIG. 6C

| FRAME1 | αt1 | βt1 | γt1 | at1 | bt1 | ct1 | dt1 |
|---|---|---|---|---|---|---|---|
| FRAME2 | αt2 | βt2 | γt2 | et2 | ft2 | gt2 | ht2 |
|  |  |  |  |  |  |  |  |
|  |  |  |  |  |  |  |  |

FIG. 6D

| FRAME1 | αt1 | βt1 | γt1 | at1 | bt1 | ct1 | dt1 |
|---|---|---|---|---|---|---|---|
| FRAME2 | αt2 | βt2 | γt2 | et2 | ft2 | gt2 | ht2 |
| FRAME3 | αt3 | βt3 | γt3 | it3 | jt3 | kt3 | lt3 |
|  |  |  |  |  |  |  |  |

FIG. 6E

| FRAME1 | αt1 | βt1 | γt1 | at1 | bt1 | ct1 | dt1 |
|---|---|---|---|---|---|---|---|
| FRAME2 | αt2 | βt2 | γt2 | et2 | ft2 | gt2 | ht2 |
| FRAME3 | αt3 | βt3 | γt3 | it3 | jt3 | kt3 | lt3 |
| FRAME4 | αt4 | βt4 | γt4 | mt4 | nt4 | ot4 | pt4 |

FIG. 7A-1

PID=0,FRAME NUMBER=1 | $\alpha t1$ | $\beta t1$ | $\gamma t1$ | at1 |

FIG. 7A-2

PID=1,FRAME NUMBER=1 | bt1 | ct1 | dt1 | |

FIG. 7A-3

PID=0,FRAME NUMBER=2 | $\alpha t2$ | $\beta t2$ | $\gamma t2$ | et2 |

FIG. 7B-1

PID=1,FRAME NUMBER=2 | ft2 | gt2 | ht2 | |

FIG. 7B-2

PID=0,FRAME NUMBER=3 | $\alpha t3$ | $\beta t3$ | $\gamma t3$ | it3 |

FIG. 7C-1

PID=1,FRAME NUMBER=3 | jt3 | kt3 | lt3 | |

FIG. 7C-2

PID=0,FRAME NUMBER=4 | $\alpha t4$ | $\beta t4$ | $\gamma t4$ | mt4 |

FIG. 7C-3

PID=1,FRAME NUMBER=4 | nt4 | ot4 | pt4 | |

FIG. 8

| | | | | | | | |
|---|---|---|---|---|---|---|---|
| FRAME1 | αt1 | βt1 | γt1 | at1 | bt1 | ct1 | dt1 |
| FRAME2 | αt2 | βt2 | γt2 | ft2 | ht2 | | |
| FRAME3 | αt3 | βt3 | γt3 | it3 | kt3 | lt3 | |
| FRAME4 | αt4 | βt4 | γt4 | mt4 | nt4 | | |

FIG. 9

| | | | | | | | |
|---|---|---|---|---|---|---|---|
| FRAME1 | αt1 | βt1 | γt1 | at1 | bt1 | ct1 | dt1 |
| FRAME2 | αt2 | βt2 | γt2 | et2 | | ft2 | ht2 |
| FRAME3 | αt3 | βt3 | γt3 | it3 | | kt3 | lt3 |
| FRAME4 | αt4 | βt4 | γt4 | mt4 | | nt4 | pt4 |

FIG. 10

| | | | | | | | |
|---|---|---|---|---|---|---|---|
| FRAME1 | αt1 | βt1 | γt1 | at1 | bt1 | ct1 | dt1 |
| FRAME2 | αt2 | βt2 | γt2 | ft2 | ht2 | | |
| FRAME3 | αt3 | βt3 | γt3 | it3 | kt3 | lt3 | |
| FRAME4 | αt4 | βt4 | γt4 | mt4 | nt4 | | |

FIG. 11

| | | | | | | | |
|---|---|---|---|---|---|---|---|
| FRAME1 | αt1 | βt1 | γt1 | at1 | bt1 | ct1 | dt1 |
| FRAME2 | αt2 | βt2 | γt2 | ft2 | | | ht2 |
| FRAME3 | αt3 | βt3 | γt3 | it3 | kt3 | | lt3 |
| FRAME4 | αt4 | βt4 | γt4 | | mt4 | | nt4 |

FIG. 12

ABNORMALITY DIAGNOSTIC SYSTEM AND ABNORMALITY DIAGNOSTIC DATA STORING METHOD

INCORPORATION BY REFERENCE

The disclosure of Japanese Patent Application No. 2000-132554 filed on May 1, 2000 including the specification, drawings and abstract is incorporated herein by reference in its entirety.

BACKGROUND OF THE INVENTION

1. Field of the Invention

The invention relates to a technology for storing abnormality diagnostic data used for diagnosing an abnormality in correspondence with the abnormal event of an abnormality when the abnormality is detected in a vehicle.

2. Description of the Background

When an abnormality occurs in a vehicle, it is preferable to store necessary data for diagnosing the abnormality.

When an abnormality occurs in a vehicle, an abnormality diagnostic system judges the abnormality and stores main data (e.g., data showing behavior of the vehicle such as engine cooling water temperature), at the time when the abnormality occurred, as abnormality diagnostic data, i.e., freeze-frame data. Whenever an abnormality occurs, this freeze-frame data is stored separately for each of the abnormal events. Types and the number of stored data are fixed irrespective of a difference in the abnormal events.

In recent years, as the complexity of control systems in vehicles has increased due to greater use of electronic circuits, the difficulty level of analysis of an abnormal event drastically rises. Further, in the case of an abnormal event related to faulty soldering in an electronic circuit, generation of the abnormality can be inconsistent depending upon the temperature of the substrate, which makes it difficult to reproduce that abnormal event.

For example, Japanese Patent Application Laid-Open Publication No. HEI 5-171998 discloses a related technology as an abnormality diagnostic system of this kind. However, in this abnormality diagnostic system, the types and the number of freeze-frame data stored whenever an abnormal event occurs are set irrespective of a difference in the abnormal events. Therefore, when an abnormality diagnosis is carried out later using such freeze-frame data, although the behavior or state of the vehicle when an abnormality occurs can be grasped from the freeze-frame data, it is extremely difficult to analyze and reproduce the abnormal event which occurred. Thus, there is no usable method except one of listing potential possibilities from the freeze-frame data and then estimating inappropriate one of the listed possibilities by a process of elimination.

SUMMARY OF THE INVENTION

It is an object of the invention to provide an abnormality diagnostic system and an abnormality diagnostic data storing method capable of storing abnormality diagnostic data which makes it easy to analyze and reproduce an abnormal event which has occurred, when an abnormality diagnosis is carried out later.

A first aspect of the invention is an abnormality diagnostic system capable of storing abnormality diagnostic data to be used for abnormality diagnosis corresponding to an abnormal event when the abnormality is detected in a vehicle, wherein the abnormality diagnosis data stored corresponding to the abnormal event is common data which is common to all abnormalities irrespective of a difference in the abnormal events, and inherent data which is inherent to each abnormal event.

According to this abnormality diagnostic system, not only the common data which is common, irrespective of a difference in abnormal events, but also the inherent data which is inherent to the abnormal event, are stored as the abnormality diagnostic data. Therefore, when abnormality diagnosis is carried out using this abnormality diagnostic data at a later stage, it is possible to easily analyze and reproduce the abnormal event which occurred by utilizing the inherent data which is inherent to the abnormal event. Further, by use of the common data it is possible to analyze the abnormal event from various viewpoints, and to analyze the abnormal event by comparing it with other abnormal events.

In the above aspect, the abnormality diagnostic system can further comprise: storing means for storing the abnormality diagnostic data; abnormality judging means for judging an abnormal event when the abnormality was detected; selecting means for selecting the inherent data which is inherent to the abnormal event corresponding to the judged abnormal event; and writing means for writing the selected inherent data together with the common data into the storing means as the abnormality diagnostic data corresponding to the abnormal event.

Since these means are provided, when an abnormality is detected, it is possible to store in the storing means the abnormality diagnostic data including the common data and the inherent data corresponding to the abnormal event.

In the above aspect, the storing means may include a common storing region in which each of the inherent data can be utilized commonly and in which the writing means can write the inherent data into the common storing region.

In this way, the inherent data section is provided not as an exclusive storing region in which the inherent data is stored exclusively, but as a common storing region in which the inherent data can be stored commonly. When an abnormality is detected, the inherent data corresponding to the abnormal event is written in the common storing region. With this feature, the storing region of the storing means is not wastefully consumed and can be utilized optimally.

In the above aspect, the common data may include data indicative of behavior of the vehicle.

Since the common data includes such data, it is possible to clearly grasp the behavior of the vehicle when an abnormality occurs.

In the above aspect, data length of the inherent data can be constant irrespective of difference of abnormal events.

Also in the above aspect, the inherent data may comprise a plurality of data, and the data length of each data can be constant.

By setting the data length in this manner, it is possible to simplify the writing operation and the reading operation with respect to the storing means, and the storing region in the storing means can be utilized effectively.

A second aspect of the invention is an abnormality diagnostic data storing method for storing in storing means abnormality diagnostic data used for abnormality diagnosis corresponding to an abnormal event of an abnormality when an abnormality is detected in a vehicle, comprising the steps of: (a) judging an abnormality when the abnormality is detected; (b) selecting at least inherent data corresponding to the judged abnormal event; and (c) storing the selected inherent data in the storing means as the abnormality diagnostic data corresponding to the abnormal event together with the common data which is common irrespective of a difference in the abnormal events.

According to this abnormality diagnostic data storing method, when an abnormality is detected in the vehicle, not only the common data but also the inherent data are stored in the storing means as abnormality diagnostic data. Therefore, when abnormality diagnosis is carried out using this abnormality diagnostic data at a later stage, it is possible to easily analyze and reproduce the abnormal event by utilizing the inherent data which is inherent to the abnormal event.

BRIEF DESCRIPTION OF THE DRAWINGS

FIGS. 7A-1 through 7C-3 are explanatory views for explaining freeze-frame data reading-out processing of the freeze-frame data stored in the EEPROM 280 shown in FIG. 3;

DETAILED DESCRIPTION OF THE PREFERRED EMBODIMENTS

Next, the invention will be illustrated based on an embodiment in the following order.

A. Overall structure of a hybrid vehicle
B. Basic operation of hybrid a vehicle
C. Structure of the control system
D. Abnormality diagnostic system:
D-1. Structure of abnormality diagnostic system:
D-2. Freeze-frame data storing processing:
D-3. Freeze-frame data reading-out processing:
D-4. Effect of the embodiment:
E. Modifications
E-1. Modification 1:
E-2. Modification 2:
E-3. Modification 3:
E-4. Modification 4:

A. Overall structure of a hybrid vehicle

Figure 1:
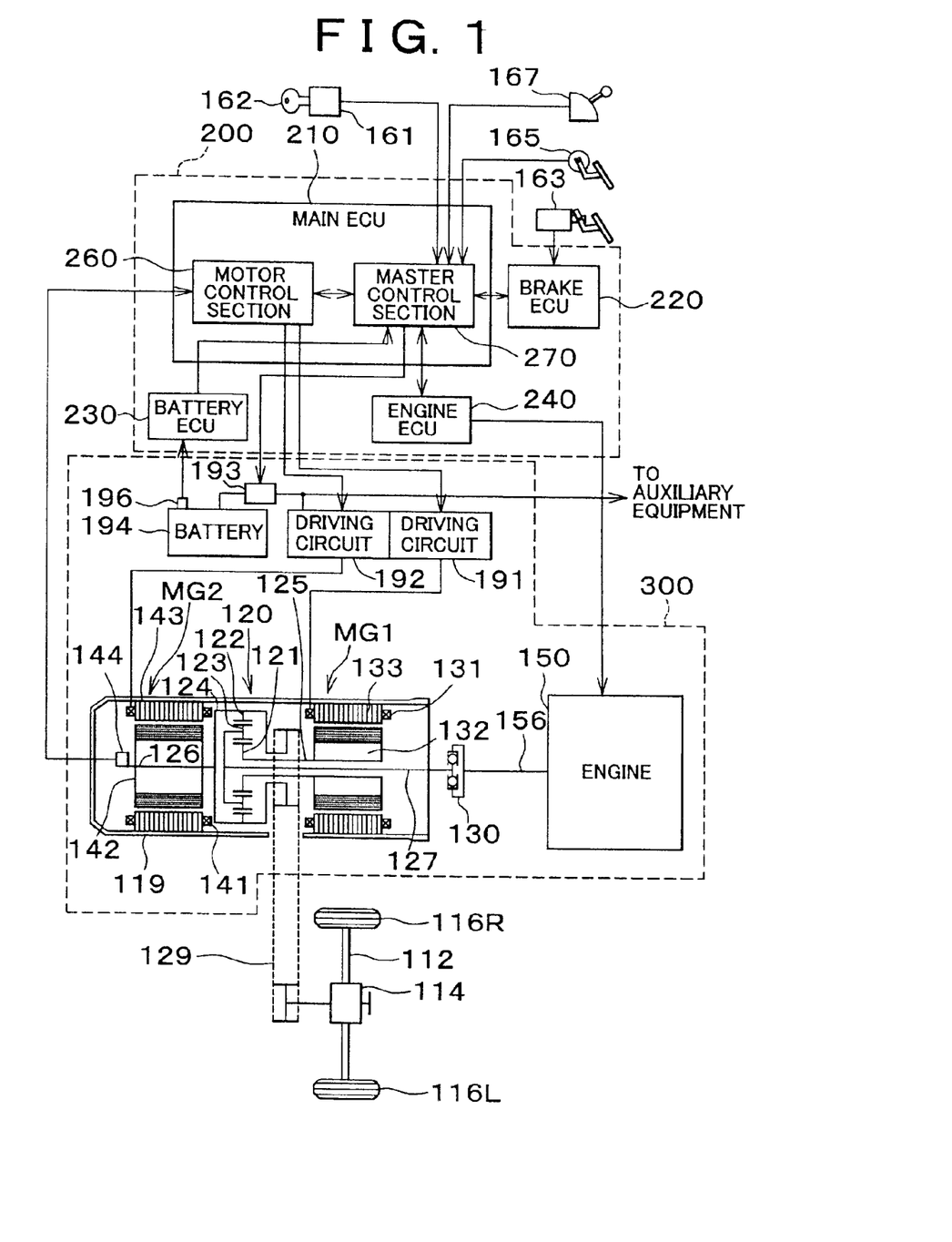
FIG. 1 is an explanatory view showing an overall structure of a hybrid vehicle to which an abnormality diagnostic system of an embodiment of the invention is applied.

An abnormality diagnostic system as one embodiment of the invention is applied to a hybrid vehicle as shown in FIG. 1 for example.

FIG. 1 is an explanatory view showing an overall structure of the hybrid vehicle to which the abnormality diagnostic system of the embodiment of the invention is applied. This hybrid vehicle includes three prime movers, i.e., an engine 150 and two motor/generators MG1 and MG2. Here, "motor/generator" means a prime mover which functions as both a motor and a generator. In the following description, the motor/generator is simply called a "motor" for the sake of simplicity. The vehicle is controlled by a control system 200.

The control system 200 includes a main ECU (hybrid ECU) 210, a brake ECU 220, a battery ECU 230 and an engine ECU 240. Each of the ECUs is formed as a unit having a plurality of circuit elements such as a microcomputer, an input interface and an output interface disposed on a single circuit substrate. The main ECU 210 includes a motor control section 260 and a master control section (hybrid control section) 270. The master control section 270 functions to determine the control amount of the distribution of outputs of the three prime movers 250, MG1 and MG2 for example.

A power system 300 includes the engine 150, the motors MG1 and MG2, driving circuits 191 and 192, a system main relay 193 and a battery 194.

The engine 150 is a normal gasoline engine, and rotates a crankshaft 156. The operation of the engine 150 is controlled by the engine ECU 240. The engine ECU 240 controls a fuel injection amount of the engine 150 and so forth.

The motors MG1 and MG2 are constituted as synchronous motors, and respectively include rotors 132 and 142 with a plurality of permanent magnets provided on the outer peripheral surface, and stators 133 and 143 around which three-phase coils 131 and 141 which form rotating fields are wound. The stators 133 and 143 are fixed to a case 119. The three-phase coils 131 and 141 wound around the stators 133 and 143 of the motors MG1 and MG2 are connected to the battery 194 via the driving circuits 191 and 192, respectively, and through the system main relay 193. The system main relay 193 is a relay switch for connecting and disconnecting the battery 194 and the driving circuits 191 and 192. The system main relay 193 is controlled by the master control section 270. Electric power from the battery 194 is also supplied to auxiliary equipment (not shown) through the system main relay 193.

The driving circuits 191 and 192 are transistor inverters, each having a pair of transistors as switching elements for each phase. The driving circuits 191 and 192 are controlled by the motor control section 260. When the transistors of the driving circuits 191 and 192 are switched by control signals from the motor control section 260, electric current flows between the battery 194 and the motors MG1 and MG2. The motors MG1 and MG2 can operate as the prime movers which rotate upon reception of electric power from the battery 194 (this operational state is hereinafter referred to as power running), or can function as generators for generating electromotive force at opposite ends of the three-phase coils 131 and 141 when the rotors 132 and 142 are rotated by external force, thereby charging the battery 194 (this operational state is hereinafter referred to as regeneration).

Rotating shafts of the engine 150 and the motors MG1 and MG2 are mechanically connected to one another through a planetary gear 120. The planetary gear 120 comprises a sun gear 121, a ring gear 122, and a planetary carrier 124 having a planetary pinion gear 123. In the hybrid vehicle of this embodiment, the crankshaft 156 of the engine 150 is connected to a planetary carrier shaft 127 through a damper 130. The damper 130 is provided for absorbing twisting vibrations generated in the crankshaft 156. The rotor 132 of the motor MG1 is connected to a ring gear shaft 126. Rotation of the ring gear 122 is transmitted to an axle 112 and wheels 116R and 116L through a chain belt 129 and a differential gear 114.

The control system 200 uses various sensors for controlling the entire vehicle, e.g., the control system 200 uses an accelerator sensor 165 for detecting a depression amount of an accelerator by the driver, a shift position sensor 167 for detecting a position of a shift lever (shift position), a brake sensor 163 for detecting a depression pressure of a brake pedal, a battery sensor 196 for detecting a charging state of the battery 194, and a revolution number sensor 144 for measuring the number of revolutions of the motor MG2. Since the ring gear shaft 126 and the axle 112 are mechanically connected to each other through the chain belt 129, a revolution number ratio of the ring gear shaft 126 and the axle 112 is constant. Therefore, it is possible to detect not only the revolution number of the motor MG2 but also the revolution number of the axle 112 by the revolution number sensor 144 provided on the ring gear shaft 126. In addition, although not a sensor, the control system 200 also uses an ignition switch 161 for actuating and stopping the power system 300 by the turning of an ignition key 162.

B. Basic Operation of a Hybrid Vehicle:

The basic operation of the hybrid vehicle is hereinafter described. First, the operation of the planetary gear 120 is described. The planetary gear 120 has a characteristic in which when the revolution numbers of two of the three rotating shafts are determined, the revolution number of the remaining rotating shaft is determined. The following equation (1) shows a relation of the revolution numbers of the rotating shafts.

$$Nc = Ns \cdot \rho + Nr \cdot 1/(1+\rho) \quad (1)$$

wherein, Nc is the revolution number of the planetary carrier shaft 127, Ns is the revolution number of the sun gear shaft 125 and Nr is the revolution number of the ring gear shaft 126. Further, ρ is a gear ratio of the sun gear 121 and the ring gear 122 as shown in the following equation.

ρ=[the number of teeth of the sun gear 121]/[the number teeth of the ring gear 122]

Also, the torque of the three rotating shafts has a constant relation, irrespective of the revolution numbers of the three rotating shafts, which is given by the following equations (2) and (3).

$$Ts = Tc \cdot \rho/(1+\rho) \quad (2)$$

$$Tr = Tc \cdot 1/(1+\rho) = Ts/\rho \quad (3)$$

wherein, Tc is torque of the planetary carrier shaft 127, Ts is torque of the sun gear shaft 125 and Tr is torque of the ring gear shaft 126.

The hybrid vehicle of this embodiment can run in various states because of the planetary gear 120. For example, at relatively low speeds when the hybrid vehicle starts running, the hybrid vehicle runs in such a manner that the motor MG2 is driven in the power running state to transmit power to the axle 112 while the engine 150 is left at rest. The hybrid vehicle also runs with the motor MG2 while the engine 150 is idling.

After the hybrid vehicle starts running, when the vehicle reaches a predetermined speed the control system 200 allows the motor MG1 to run in the power running state, and the output torque motors and starts the engine 150. At this time, reaction torque is also output to the ring gear 122 through the planetary gear 120.

If the engine 150 is driven to rotate the planetary carrier shaft 127, the sun gear shaft 125 and the ring gear shaft 126 rotate under conditions satisfying the above equations (1) to (3). The power generated by the rotation of the ring gear shaft 126 is transmitted directly to the wheels 116R and 116L. The power generated by the rotation of the sun gear shaft 125 can be used as electric power by the first motor MG1. On the other hand, when the second motor MG2 is driven in the power running state, the power can be output to the wheels 116R and 116L through the ring gear shaft 126.

During steady driving, the output of the engine 150 is set to a value substantially equal to the power required by the axle 112 (i.e., the number of revolutions of the axle 112× torque). At this time, a portion of the output of the engine 150 is transmitted directly to the axle 112 through the ring gear shaft 126, and the remaining output is regenerated as electric power by the first motor MG1. The regenerated electric power is used by the second motor MG2 for generating torque for the rotating the ring gear shaft 126. As a result, it is possible to drive the axle 112 with a desired revolution number and desired torque.

When torque transmitted to the axle 112 is insufficient, the second motor MG2 provides torque assist. The electric power regenerated by the first motor MG1 and the electric power accumulated in the battery 149 are used to provide this torque assist. In this manner, the control system 200 controls operations of the two motors MG1 and MG2 in accordance with the required power to be output from the axle 112.

The hybrid vehicle of this embodiment can also run in reverse with the engine 150 operating. When the engine 150 is operated, the planetary carrier shaft 127 rotates in the same direction as when running forward. At this time, if the first motor MG1 is controlled to rotate the sun gear shaft 125 at a higher revolution number than that of the planetary carrier shaft 127, the ring gear shaft 126 reverses to rotate in the reverse direction, as is apparent from the equation (1). The control system 200 can control the output torque of the second motor MG2 to allow the hybrid vehicle to run in reverse while rotating the second motor MG2 in the reverse direction.

In a state in which the ring gear 122 is at rest, the planetary gear 120 can rotate the planetary carrier 124 and the sun gear 121. Therefore, even when the vehicle is at rest, the planetary gear 120 can drive the engine 150. For example, when the charge amount of the battery 194 is reduced to a low level, the engine 150 is driven and the first motor MG1 is regeneratively driven so that the battery 194 can be charged. When the vehicle is at rest and the first motor MG1 is driven in the power running state, it is possible for the motor to start the engine 150.

Figure 2:
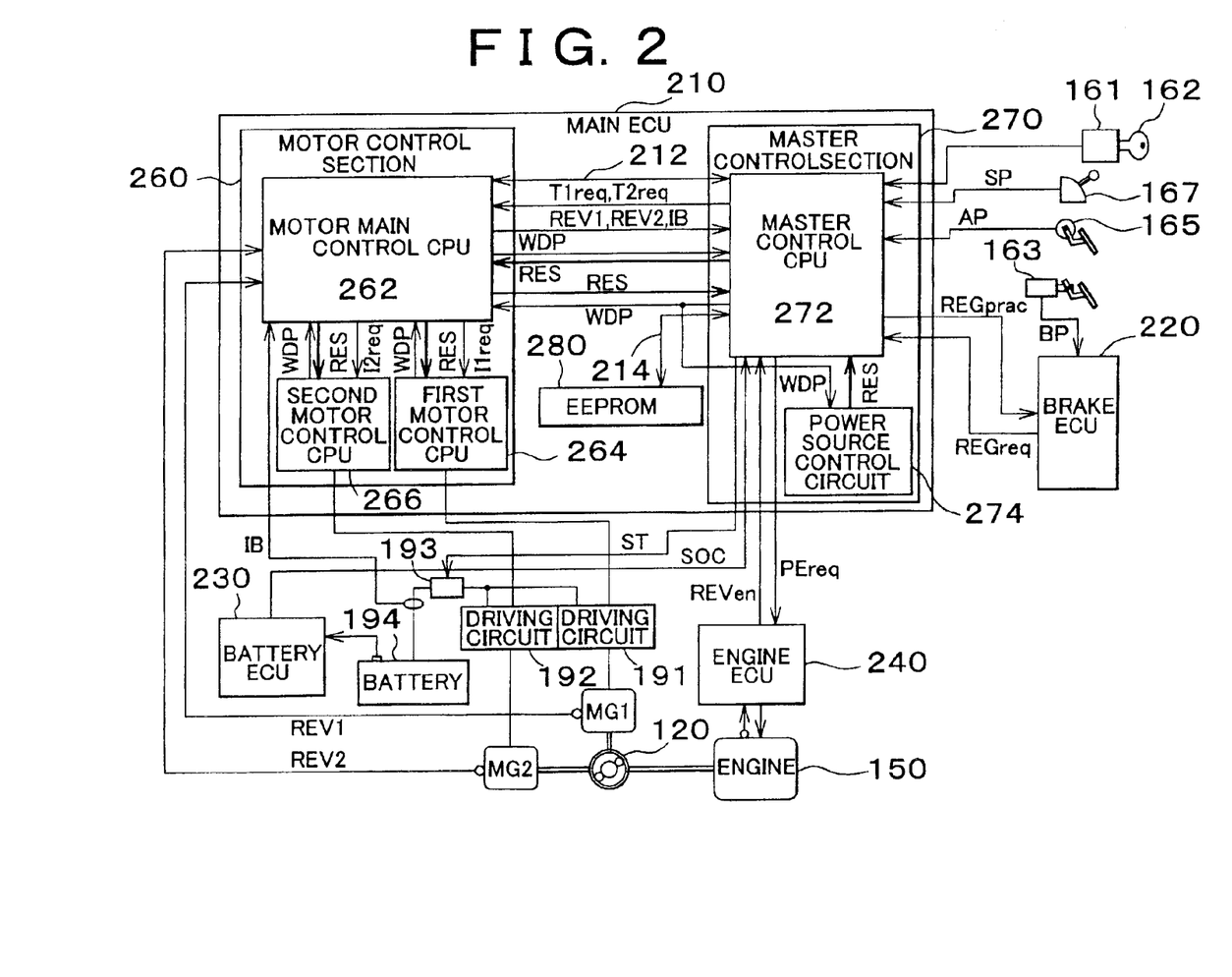
FIG. 2 is a block diagram showing a more detailed structure of a control system 200 of the embodiment.

C. Structure of the Control System:

FIG. 2 is a block diagram showing a more detailed structure of the control system 200 of this embodiment. A master control section 270 includes a master control CPU 272 and a power source control circuit 274. The motor control section 260 includes a motor main control circuit 274 and two motor control CPUs 264 and 266 for controlling the two motors MG1 and MG2, respectively. Each CPU includes a CPU, ROM, RAM, an input port and an output port (all not shown), and constitutes a one-chip microcomputer together with these elements.

The master control CPU 272 has a function to control the startup of the power system 300, a function to determine the control amount of the revolution numbers and distribution of torque of the three prime movers 150, MG1 and MG2, for example, and a function to supply the various required amounts to other CPUs and ECUs to control actuation of each prime mover. To perform these controls, an ignition switch signal IG, an accelerator position signal AP indicative of accelerator opening, and shift position signals SP1 and SP2 indicative of shift positions and the like are supplied to the master control CPU 272. The master control CPU 272 outputs a startup signal ST to a system main relay 198 and the like. The shift position sensor 167, the accelerator sensor 165 and the like are used if necessary.

The power source control circuit 274 is a DC/DC converter for converting high direct current voltage of the battery 194 into low direct current voltage for each circuit in the main ECU 210. This power source control circuit 274 also functions as a monitor circuit for monitoring abnormalities of the master control CPU 272.

The engine ECU 240 controls the engine 150 in accordance with an engine output required value PEreq given by the master control CPU 272. From the engine ECU 240, the revolution number REVen of he engine 150 is fed back to the master control CPU 272.

A motor main control CPU 262 respectively supplies current required values I1req and I2req to the two motor control CPUs 264 and 266 in accordance with torque required values T1req and T2req relating to the motors MG and MG2 sent from the master control CPU 272. The motor control CPUs 264 and 266 respectively control the driving circuits 191 and 192 in accordance with the current required values I1req and I2req, thereby driving the motors MG1 and MG2, respectively. From the revolution number sensors of the motors MG1 and MG2, the revolution numbers REV1 and REV2 of the motors MG and MG2 are fed back to the motor main control CPU 262. The revolution numbers REV1 and REV2 of the motors MG1 and MG2, and a current value IB from the battery 194 to the driving circuits 191 and 192 are fed back from the motor main control CPU 262 to the master control CPU 272.

The battery ECU 230 monitors a charge amount SOC of the battery 194 and supplies a monitored value to the master control CPU 272. The master control CPU 272 determines an output to each prime mover while taking this charge amount SOC into consideration. That is, when charging is required, power greater than that required for running is output to the engine 150 and a portion of that output is distributed for the charging operation by the first motor MG1.

The brake ECU 220 controls the balance of a hydraulic brake (not shown) and the regenerative brake by the second motor MG2, because in the hybrid vehicle, the regenerative operation by the second motor MG2 is carried out at the time of braking such that the battery 194 is charged. More specifically, the brake ECU 220 inputs a regeneration required value REGreq to the master control CPU 272 based on a braking pressure BP from the brake sensor 163. The master control CPU 272 determines the operation of the motors MG1 and MG2 based on this required value REGreq, and feeds back a regeneration execution value REGprac to the brake ECU 220. The brake ECU 220 controls the braking amount by the hydraulic brake to an appropriate value based on the braking pressure BP and a difference between the regeneration execution value REGprac and the regeneration required value REGreq.

As described above, the master control CPU 272 determines the outputs of the prime movers 150, MG1 and MG2, and supplies the required values to the corresponding ECU 240 and CPUs 264 and 266. The ECU 240 and CPUs 264 and 266 control the prime movers in accordance with the required values. As a result, the hybrid vehicle can output appropriate power in accordance with a running state, and thereby run. During braking, the brake ECU 220 and the master control CPU 272 coordinate with each other to control the operation of the prime movers and the hydraulic brake. As a result, it is possible to regenerate electric power while realizing braking in which a driver does not feel a great sense of discomfort.

The four CPUs 272, 262, 264 and 266 function to monitor each other for abnormalities using a so-called watch dog pulse WDP, and when an abnormality occurs in any of the CPUs and the watch dog pulse is stopped, a reset signal RES is supplied to that CPU to reset the CPU. The power source control circuit 274 also monitors the master control CPU 272 for abnormalities.

An EEPROM (Electrically Erasable Programmable Read-Only Memory) is a storing means for storing at least a diag code indicative of an abnormal event when the abnormal event occurs, and freeze-frame data which is abnormality diagnostic data used for abnormality diagnosis. The master control CPU 272 and the EEPROM 280 can make various requests and communicate between each other through a two-way communication wire 214. Another two-way communication wire 212 is provided also between the master control CPU 272 and the motor main control CPU 262.

Figure 3:
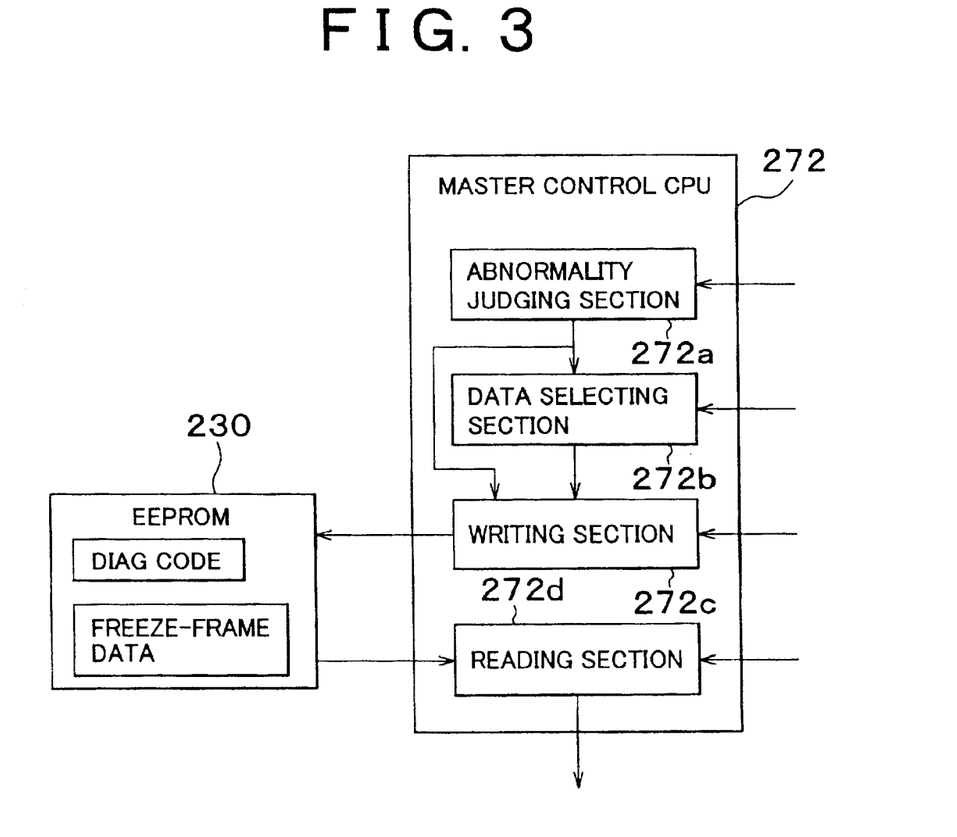
FIG. 3 is a block diagram showing a structure of an essential portion of the abnormality diagnostic system which is applied to the hybrid vehicle shown in FIG. 1.

D. Abnormality Diagnostic System:

D-1. Structure of the Abnormality Diagnostic System:

FIG. 3 is a block diagram showing a structure of an essential portion the abnormality diagnostic system which is applied to the hybrid vehicle shown in FIG. 1. The master control CPU 272 functions as an abnormality judging section 272a, a data selecting section 272b, a writing section 272c, and a reading section 272d. The abnormality judging section 272a detects the occurrence of an abnormality based on various signal inputs to the master control CPU 272, and judges the abnormal event. Corresponding to the judged abnormal event, the data selecting section 272b selects data inherent in this abnormal event from data input to the master control CPU 272 or data generated in the master control CPU 272. The writing section 272c writes the selected inherent data to the EEPROM 280 as freeze-frame data together with common data which is common irrespective of differences in the abnormal events. A reading section 272d reads out desired freeze-frame data from data stored in the EEPROM 280 in accordance with requirements from the diag tester. These functions of each section 272a to 272d are realized by executing programs stored in ROM (not shown) by the master control CPU 272.

Figure 4:
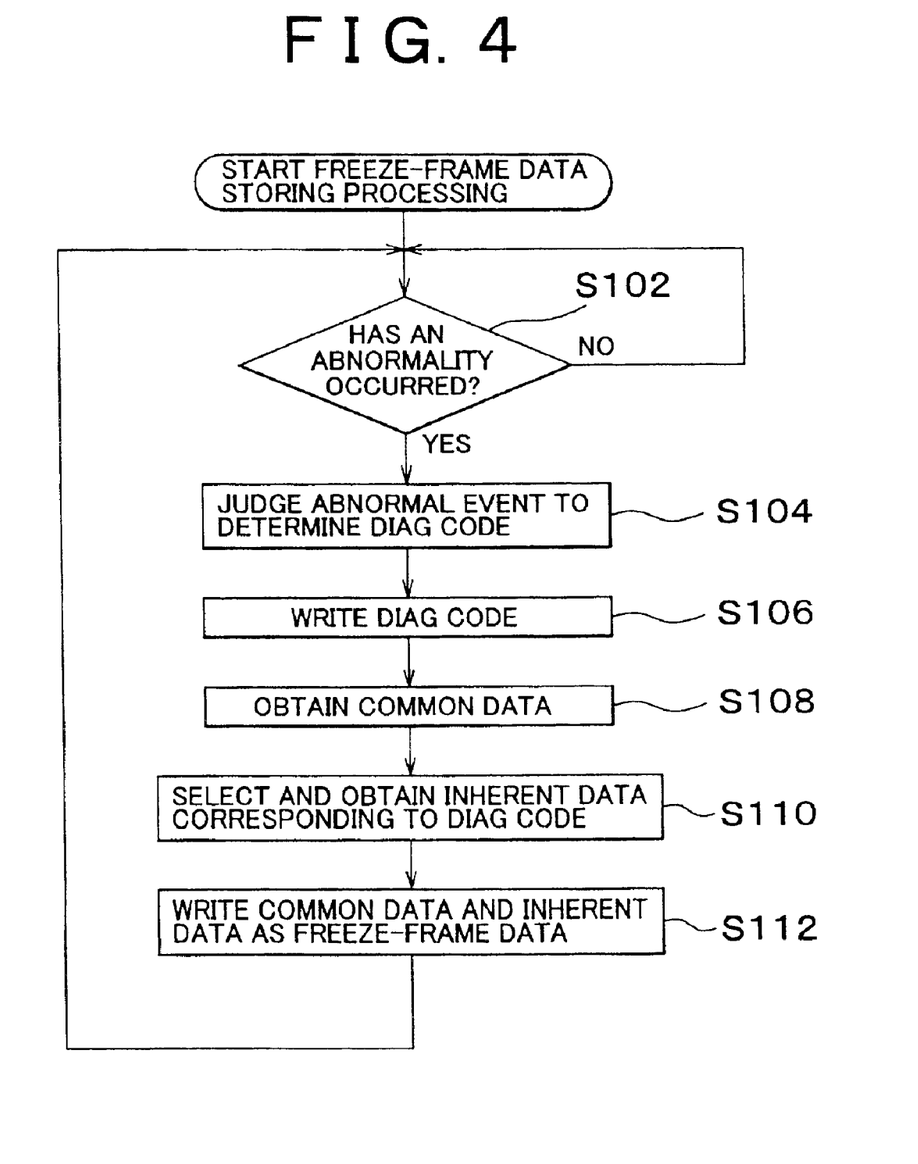
FIG. 4 is a flowchart showing a processing procedure of freeze-frame data storing processing achieved by the abnormality diagnostic system shown in FIG. 3.

D-2. Freeze-frame Data Storing Processing:

FIG. 4 is a flowchart showing a procedure of freeze-frame data storing processing achieved by the abnormality diagnostic system shown in FIG. 3. FIGS. 5A through 5E are explanatory views showing a diag code storing region in an EEPROM 280 shown in FIG. 3 and showing diag codes sequentially stored in the diag code storing region, and FIGS. 6A through 6E are explanatory views showing a freeze-frame data storing region in the EEPROM 280 shown in FIG. 3 and freeze-frame data sequentially stored in that freeze-frame data storing region. If the freeze-frame data storing processing shown in FIG. 4 is started, the abnormality judging section 272a inputs signals output from the brake ECU 220, the battery ECU 230, the engine ECU 240 and various sensors. Based on these signals, the abnormality judging section 272a judges whether an abnormality has occurred under control of the main ECU 210 (step S102), and if an abnormality has not occurred, the abnormality judging section 272a goes into standby until an abnormality occurs.

If an abnormality has occurred, the abnormality judging section 272a judges the type of the abnormality based on the input signals, and determines a diag code corresponding to the judged abnormal event (step S104).

Figure 5A:
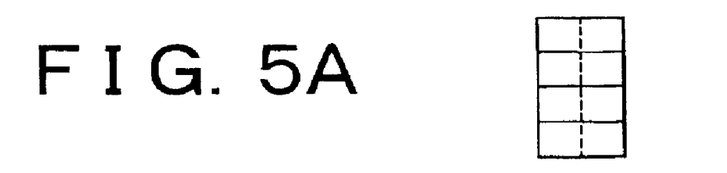
FIGS. 5A through 5E are explanatory views showing a diag code storing region in an EEPROM 280 shown in FIG. 3 and showing diag codes sequentially stored in the diag code storing region.
Figure 5B:
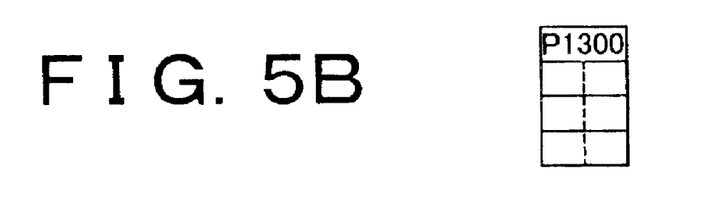

Next, the writing section 272c writes the determined diag code in the diag code storing region of the EEPROM 280 (step S106). In this embodiment, the diag code storing region can store four diag codes, with each diag code being two bytes, as shown in FIG. 5A. Note that the number of bytes and the number of codes which can be stored are shown as an example only, and the invention is not limited thereto.

When the diag code determined by the abnormality judging section 272a is "P1300", for example, and nothing is stored yet in the diag code storing region as shown in FIG. 5A, the writing section 272c writes the determined diag code "P1300" to the top of the diag code storing region.

Next, referring back to FIG. 4, the writing section 272c obtains data (common data) which is common irrespective of a difference in diag code (i.e., difference in abnormal event) from various data generated in the motor main control CPU 262, the brake ECU 220, the battery ECU 230, the engine ECU 240 and various sensors, and data generated in the master control CPU 272 (step S108).

In this embodiment, data mainly showing the behavior of the vehicle, for example, as common data is as follows:

Inverter temperature of the driving circuit 191 for the motor MG1
Inverter temperature of the driving circuit 192 for the motor MG2
Temperature of the motor MG1
Temperature of the motor MG2
Direct voltage
Direct current
Analogue voltage of the shift position sensor 167
Shift switch position of the shift position sensor 167
Accelerator main voltage of the accelerator sensor 165
Accelerator sub-voltage of the accelerator sensor 165
Auxiliary equipment battery voltage
The number of revolutions of the motor MG1
The number of revolutions of the motor MG2
Torque of the motor MG1
Torque of the motor MG2
Required power of the engine 150
Cooling water temperature of the engine 150
Remaining capacity of the battery 194

Note that this invention is not limited to these. That is, all of these need not be stored as common data. Also, data other than these may be stored as common data.

Next, based on the diag code determined by the abnormality judging section 272a, the data selecting section 272b selects and obtains data (inherent data) which is inherent in the diag code (i.e., abnormal event) from various data input from the motor main control CPU 262, the brake ECU 220, the battery ECU 230, the engine ECU 240 and various sensors, and data generated in the master control CPU 272 (step S110). Note that the corresponding relationship of the diag code and the inherent data which should be selected is already stored in the ROM (not shown). That is, based on the diag code determined by the abnormality judging section 272a, the data selecting section 272b accesses the ROM, and grasps what data should be selected corresponding to the diag code, and then selects and obtains the inherent data from the above-described data. Examples of the inherent data for each abnormal event are as follows:

[1] Abnormal Event: When Energy is Lost Due to Insufficient Engine Torque
  Throttle opening
  Air-fuel ratio correction amount
  Specific volume of intake air
  Amount of gasoline remaining (run out of gasoline)

[2] Abnormal Event: In the Case of Excessive Current of Inverter
  Current feedback correction amount
  Three-phase current value
  Phase angle Note that this invention is not limited to these; various data is possible for each of the abnormal events.

Figure 6A:
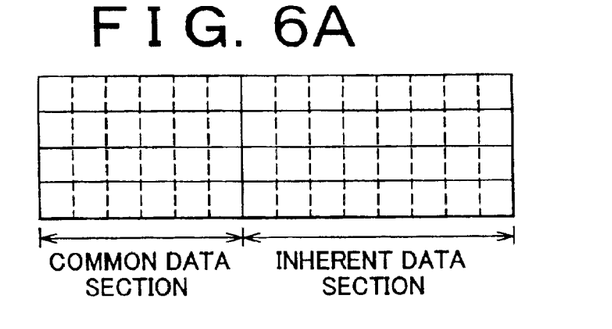
FIGS. 6A through 6E are explanatory views showing a freeze-frame data storing region in the EEPROM 280 shown in FIG. 3, and freeze-frame data sequentially stored in that freeze-frame data storing region.
Figure 6B:
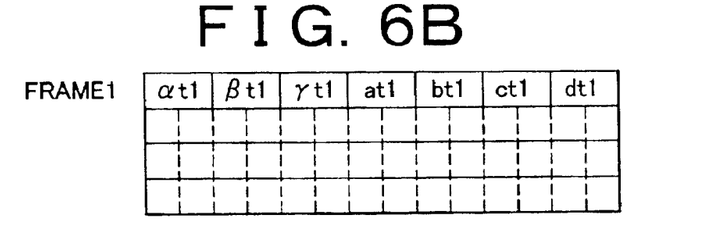

Next, the writing section 272c writes the obtained common data and inherent data in the freeze-frame data storing region of the EEPROM 280 as the freeze-frame data (step S112). In this embodiment, as shown in FIG. 6A, the freeze-frame data storing region can store four items of freeze-frame data (i.e., freeze-frame data corresponding to four diag codes), with the freeze-frame data of one frame corresponding to one diag code being 14 bytes. The freeze-frame data storing region is divided into a common data section for storing the common data and an inherent data section for storing the inherent data for each of the frames. Six bytes are allocated to the common data section, and eight bytes are allocated to the inherent data section. The number of bytes and the number of codes which can be stored are shown as an example only, and the invention is not limited thereto.

When the diag code determined by the abnormality judging section 272a is "P1300", for example, and the common data obtained by the writing section 272c are three data $\alpha t1$, $\beta t1$ and $\gamma t1$ of two bytes each, and the inherent data obtained for the diag code "P1300" by the data selecting section 272b are four data at1, bt1, ct1, dt1 of two bytes each, the writing section 272c writes the common data $\alpha t1$, $\beta t1$ and $\gamma t1$ and the inherent data at1, bt1, ct1, dt1 to the top of the free data storing region as the freeze-frame data of one frame. At this time, the writing section 272c writes the 3×2 bytes of common data $\alpha t1$, $\beta t1$ and $\gamma t1$ in the common data section, and writes the 4×2 bytes of inherent data at1, bt1, ct1, dt1 in the inherent data section.

When the writing of the freeze-frame data for one abnormal event is complete, the procedure returns to the processing in step S102 and the same processing is repeated.

As a result, whenever an abnormal event is detected, the master control CPU 272 writes a diag code corresponding to the abnormal event to the next vacant location in the EEPROM 280 as shown in FIGS. 5A through 5E, and writes the common data and the inherent data corresponding to the diag code into the next vacant location to the freeze-frame data storing region as the freeze-frame data as shown in FIGS. 6A through 6E.

Figure 5C:
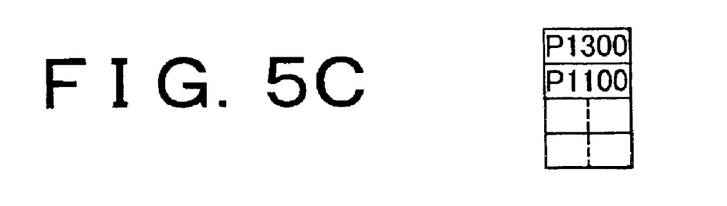
Figure 6C:
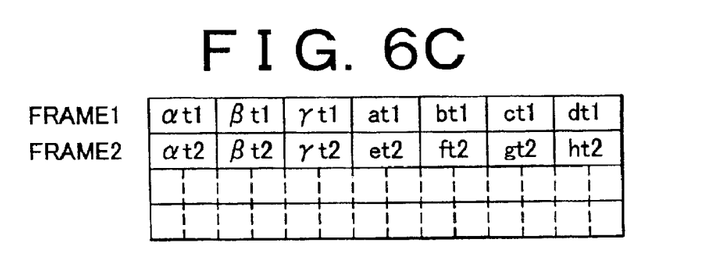
Figure 6D:
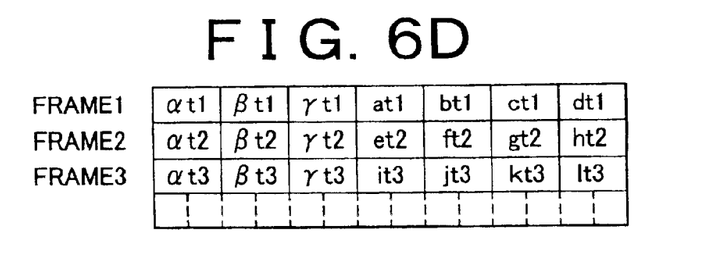
Figure 6E:
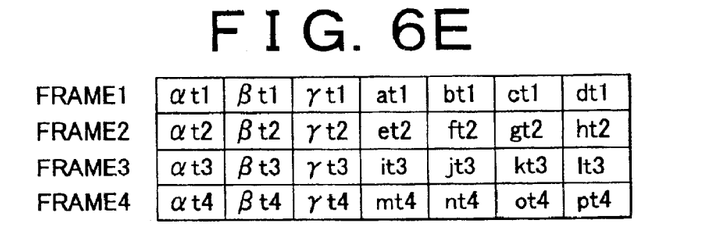

That is, when a second abnormal event is detected, if a diag code corresponding to the judged abnormal event is "P1100", as shown in FIG. 5C, that "P1100" is written as the diag code to the location next to the "P1300" which was stored the previous time, and as the freeze-frame data, as shown in FIG. 6C, common data $\alpha t2$, $\beta t2$ and $\gamma t2$ which is common to that of the first time, and inherent data et2, ft2, gt2 and ht2 corresponding to the diag code "P1100" are written to the location next to the freeze-frame data which was stored the previous time.

Here, the types of data of the second common data $\alpha t2$, $\beta t2$ and $\gamma t2$ and the first common data $\alpha t1$, $\beta t1$ and $\gamma t1$ are the same. However, since the obtained times of the first and second abnormal events are different, the contents of the data are different. The same applies to third and fourth abnormality detection.

Figure 5D:
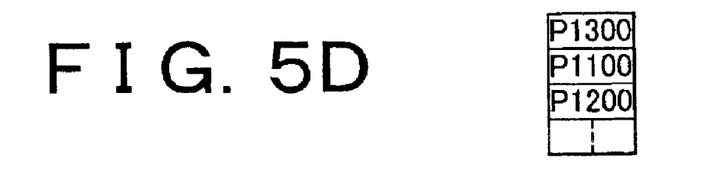
Figure 5E:
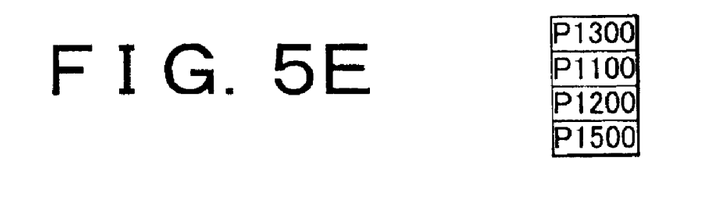

In a third abnormality detection, if a diag code corresponding to the judged abnormal event is "P1200", for example, as shown in FIG. 5D, that "P1200" is written to the next location as the diag code, and the inherent data it3, jt3 and lt3 corresponding to the diag code "P1200" is written to the next location as the freeze-frame data in addition to the common data $\alpha t1$, $\beta t1$ and $\gamma t1$ which are common to the first and second common data. Further, in a fourth abnormality detection, if a diag code corresponding to the judged abnormal event is "P1500", for example, as shown in FIG. 5E, that "P1500" is written to the next location as the diag code, and the inherent data mt4, nt4 and pt4 corresponding to the diag code "P1500" is written to the next location as the freeze-frame data in addition to the common data $\alpha t1$, $\beta t1$ and $\gamma t1$ which are common to the first to third common data.

In this manner, according to this embodiment, whenever an abnormality is detected, the diag code and the freeze-frame data are written to the next vacant location in each storing region. Therefore, the diag codes and freeze-frame data are stored in the order in which the abnormalities were detected. To make the order in which the abnormalities were detected clearer, numbers or symbols corresponding to that order may be stored together with the diag codes and the freeze-frame data.

If four abnormal events have been written in the EEPROM 280 together with the diag codes and freeze-frame data corresponding thereto in this manner, there is no vacant region available in the EEPROM 280, and therefore the writing section 272c does not write diag code or freeze-frame data even if an abnormality is detected thereafter. That is, once an abnormal event has occurred, that diag code and freeze-frame data are not written over, but must be held until an abnormality diagnosis is carried out. However, if the number of abnormal events increases, the amounts of diag codes and freeze-frame data will increase correspondingly, such that there will eventually not be enough storing capacity of the EEPROM 280. In this embodiment, as mentioned above, the number of abnormal events to be stored (i.e., the number of frames) is limited to four, and the fifth and subsequent abnormal events are not written even if they are detected. The number of abnormal events to be stored (i.e., the number of frames) is only an example, and the invention is not limited thereto.

D-3. Freeze-frame Data Reading Processing:

Next, processing for reading freeze-frame data stored in the EEPROM 280 for carrying out the abnormality diagnosis will be described briefly.

FIGS. 7A-1 through 7C-3 are explanatory views for explaining freeze-frame data reading-out processing of the freeze-frame data stored in the EEPROM 280. When the abnormality diagnosis is carried out, a user connects a diag tester which is an abnormality diagnostic tool to a connector (not shown) provided at a predetermined portion in the vehicle, and operates the diag tester. When this is done, the diag tester first requests the master control CPU 272 to inform the number of diag codes stored in the EEPROM 280. Accordingly, the reading section 272d obtains the number of stored diag codes from the EEPROM 280 and outputs it to the diag tester. Next, when the diag tester requests a read out the diag codes, the reading section 272d sequentially reads the stored diag codes from the EEPROM 280 and outputs them to the diag tester. More specifically, if the diag codes are stored in a diag code storing region of the EEPROM 280 as shown in FIGS. 5A through 5E, "P1300", "P1100", "P1200" and "P1500" are sequentially output as diag codes. That is, the diag codes are output to the diag tester in the order in which the abnormalities were detected. As described above, when numbers or symbols corresponding to that order are stored together with the diag codes, the order in which the abnormalities were detected can be recognized by the diag tester more clearly by reading out those numbers or symbols and outputting them to the diag tester.

Figure 7A:
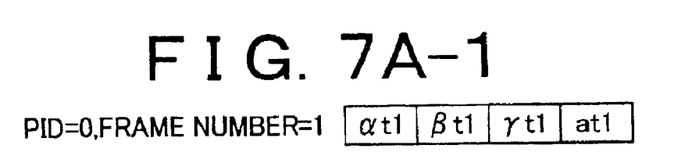

Next, if the diag tester designates a parameter ID (PID) and a frame number and requests a read out of the freeze-frame data, the reading section 272d reads out the freeze-frame data of a corresponding frame from the EEPROM 280 in accordance with the designated PID and the frame number and outputs it to the diag tester.

For example, if the diag tester designates "0" as the PID and designates "1" as the frame number as shown in FIG. 7A-1, the reading section 272d reads out data of the first eight bytes from the freeze-frame data of one frame stored in the EEPROM 280 and outputs the same to the diag tester. Then, if the diag tester designates "1" as the PID and designates "1" as the frame number, the reading section 272d reads out data of the next eight bytes from the freeze-frame data of one frame and outputs it to the diag tester.

That is, in this embodiment, when the PID is "0", the reading section 272d reads out data of the first eight bytes, and when the PID is "1", the reading section 272d reads data of the next eight bytes. However, in the case of the freeze-frame data storing region, since one frame has only 14 bytes, if the PID is "1", the data of only six bytes is actually read out, and the remaining two bytes are output to the diag tester as vacant data.

Figure 7A:
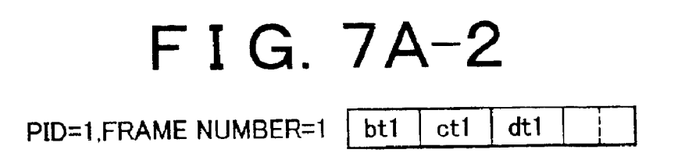
Figure 7A:
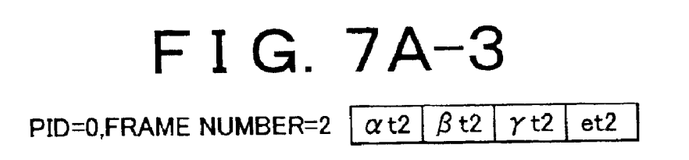

Therefore, by the above-described reading-out operation, a total of eight bytes of data including three common data $\alpha t1$, $\beta t1$ and $\gamma t1$ and one inherent data at1 in a frame 1 are output to the diag tester as shown in FIG. 7A-1. Next, a total of eight bytes of data (substantially six bytes) including the remaining three inherent data bt1, ct1, dt1, and the vacant data in the frame 1 is output as shown in FIG. 7A-2.

Figure 7B:
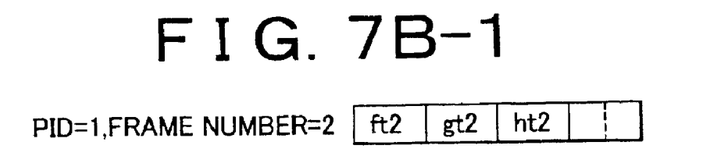
Figure 7B:
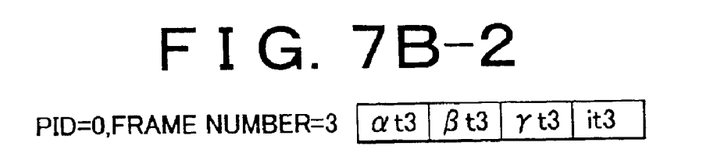
Figure 7C:
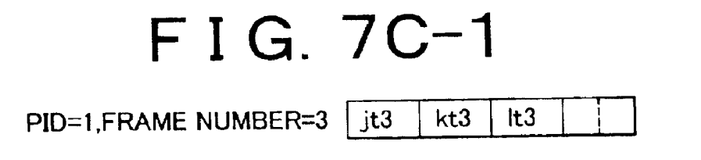
Figure 7C:
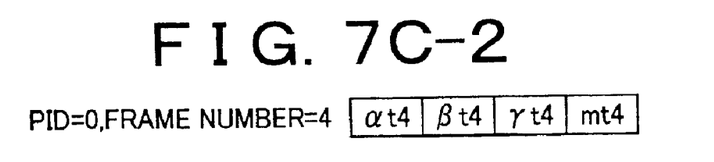
Figure 7C:
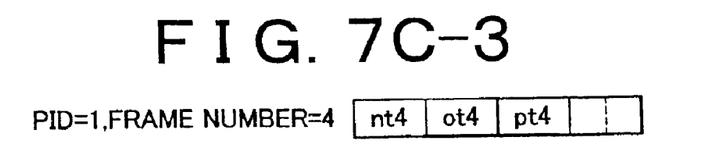

Next, if the diag tester designates "0" as the PID again but "3" as the frame number as shown in FIG. 7B-1, the reading section 272d reads the first eight bytes of data from the freeze-frame data of a frame 2 stored in the EEPROM 280, i.e., three common data $\alpha t2$, $\beta t2$ and $\gamma t2$ and one inherent data et2, and outputs them to the diag tester. Then, if the diag tester designates "1" as the PID and "2" as the frame number as shown in FIG. 7B-2, the reading section 272d reads out the next eight bytes (substantially six bytes) of data, i.e., the remaining three inherent data ft2, gt2, and ht2, from the freeze-frame data of the frame 2, and outputs them to the diag tester.

Thereafter, freeze-frame data of frames 3 and 4 can be output to the diag tester by sequentially designating "0" and "1" instead of "3" and "4" in the same manner.

Since the diag tester previously obtains the diag code as described above, the diag tester grasps the diag code to which each freeze-frame data of frames 1 to 4 corresponds. Thus, whenever the freeze-frame data of one frame is output to the diag tester, the diag tester can indicate, on a display, the corresponding diag code and data value constituting the freeze-frame data. Therefore, a user can confirm the contents of each data constituting the freeze-frame data from the displayed diag code by a previously prepared specification or the like. That is, in this embodiment, the freeze-frame data is divided into the common data and the inherent data. With the common data, the types of data constituting it are the same for each diag code so it is easy to grasp the contents of data constituting the common data. With the inherent data, however, the types of data constituting it are different with each diag code. Therefore, it is difficult to know the contents of the data without using a specification or the like.

When the diag tester includes a table showing the relation between diag codes and types of data constituting the inherent data, the diag tester can display the contents of the data constituting the freeze-frame data and values of the data when the diag tester displays the diag code.

In this manner, the user carries out the abnormality diagnosis based on the contents of the diag code and freeze-frame data displayed by the diag tester.

D-4: Effect of the Embodiment:

As described above, in this embodiment, as freeze-frame data stored when an abnormality is detected, not only the common data which is common irrespective of a difference in abnormal events, but also the inherent data which is inherent to the judged abnormal event is also stored. Therefore, when the stored freeze-frame data is read out to carry out the abnormality diagnosis at a later stage, it is possible to easily analyze and reproduce the abnormal event which occurred by utilizing the inherent data which is inherent to the abnormal event. Further, if the common data in the freeze-frame data is utilized, it is possible to clearly grasp the behavior of the vehicle when an abnormality occurs for each abnormal event. It is also possible to analyze the abnormal event from various viewpoints, and to analyze the abnormal event by comparing it with other abnormal events.

In the inherent data section in the freeze-frame data storing region in the EEPROM 280, different inherent data is stored for each abnormal event. In this embodiment, as shown in FIGS. 6A through 6E, the inherent data section is provided not as an exclusive storing region in which each inherent data is used exclusively, but as a common storing region in which each inherent data can be stored commonly. Therefore, the storing region of the EEPROM 280 is not wastefully consumed and can be utilized optimally.

Further, as shown in FIGS. 6A through 6E, the data length of the inherent data is eight bytes and is constant, and the data length of each data constituting the inherent data is two byes and is also constant. Therefore, it is possible to easily write and read the freeze-frame data.

E. Modifications

This invention is not limited to the foregoing embodiment and mode, but can be modified without departing from the scope thereof.

Figure 8:
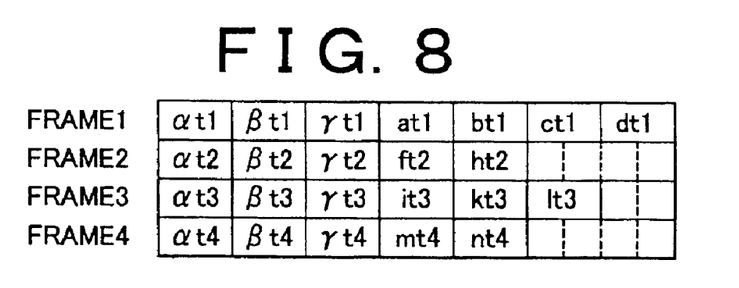
FIG. 8 is an explanatory view showing another example of the freeze-frame data stored in the freeze-frame data storing region in the EEPROM 280 shown in FIG. 3.
Figure 10:
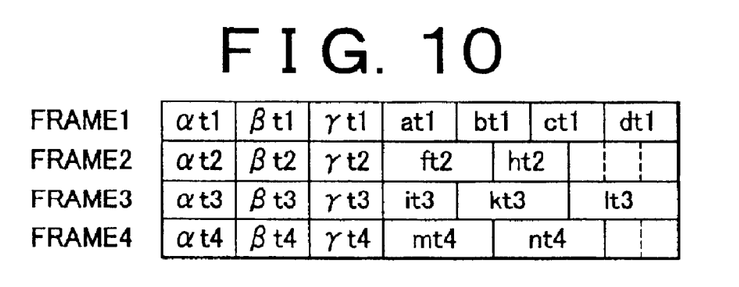
FIG. 10 is an explanatory view showing another example of the freeze-frame data stored in the freeze-frame data storing region in the EEPROM 280 shown in FIG. 3.

E-1. Modification 1:

In the above embodiment, the data length of each inherent data is eight bytes and is constant irrespective of a difference in abnormal events, but the data length of the inherent data may be changed for each abnormal event so that the entire data length of the freeze-frame data is changed as shown in FIG. 8 or FIG. 10.

Figure 9:
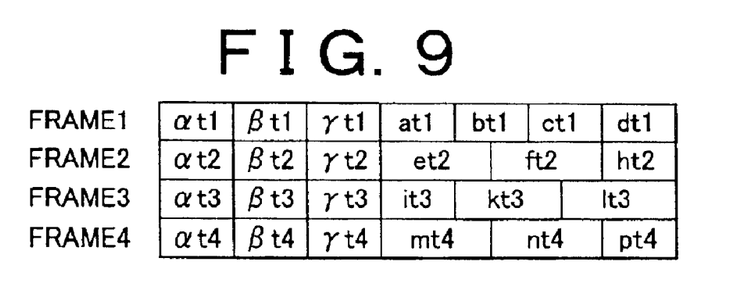
FIG. 9 is an explanatory view showing another example of the freeze-frame data stored in the freeze-frame data storing region in the EEPROM 280 shown in FIG. 3.

Further in the above embodiment, although the data length of data constituting the inherent data is two bytes and is constant in the above embodiment, the data length of data constituting the inherent data may be changed for each abnormal event as shown in FIG. 9 or FIG. 10.

Figure 11:
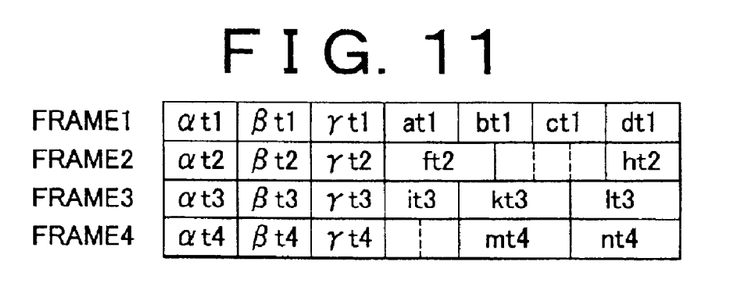
FIG. 11 is an explanatory view showing another example of the freeze-frame data stored in the freeze-frame data storing region in the EEPROM 280 shown in FIG. 3.

Also in the above embodiment, although the freeze-frame data for one frame is stored without providing a vacant region in the above embodiment, a vacant region may be provided at an intermediate portion of the storing region and stored therein as shown in FIG. 11.

Figure 12:
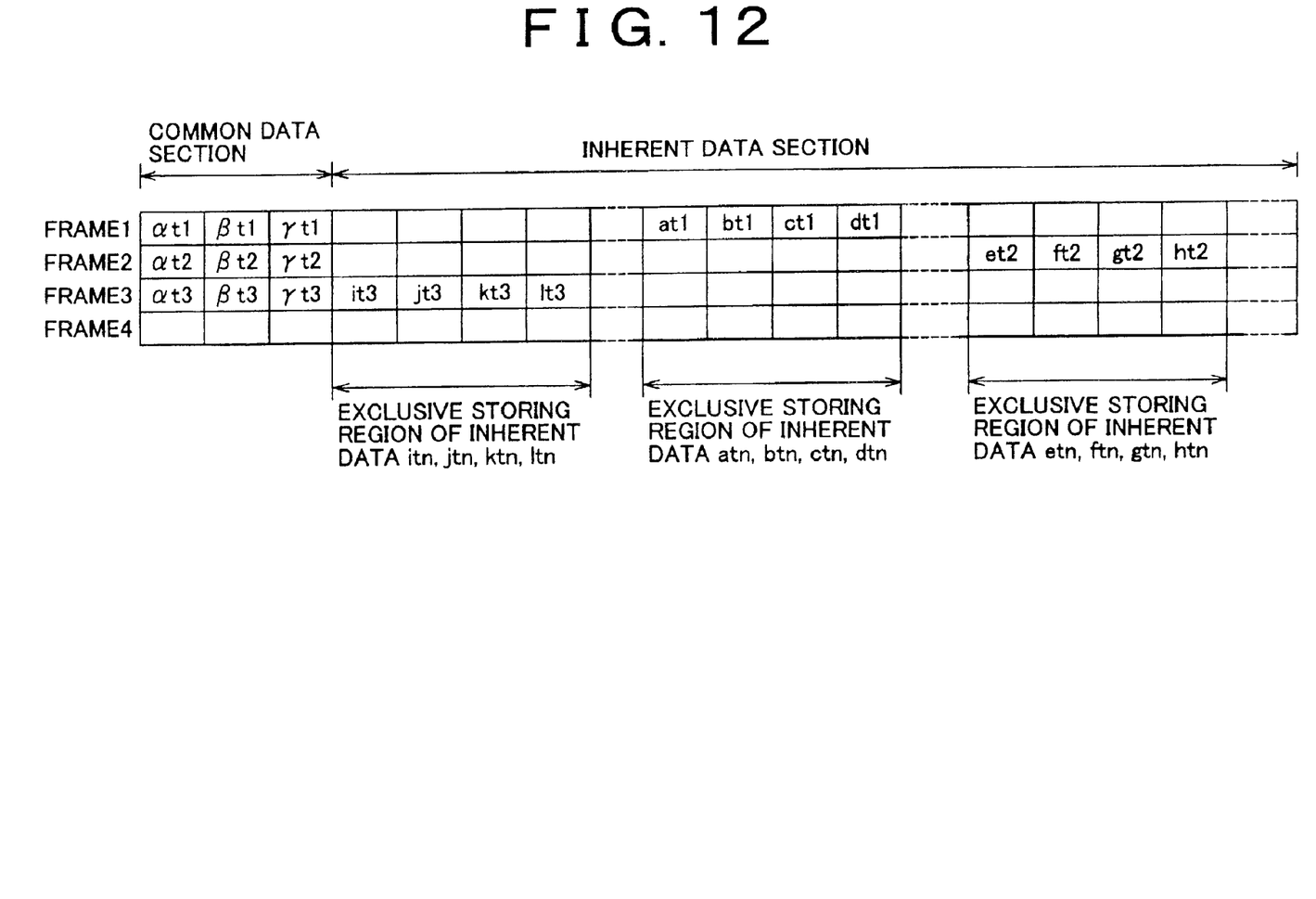
FIG. 12 is an explanatory view showing another example of the freeze-frame data stored in the freeze-frame data storing region in the EEPROM 280 shown in FIG. 3.

In addition in the above embodiment, the inherent data section is provided as the common storing region in which each inherent data can commonly be used in the freeze-frame data storing region. When there is enough storing capacity of the EEPROM 280, however, the inherent data section may be provided as an exclusive storing region in which each inherent data can be stored exclusively as shown in FIG. 12.

E-2. Modification 2:

In the above embodiment, the master control CPU 272 and the EEPROM 280 in the main ECU 210 are used to store the abnormality diagnostic data for an abnormal event which has occurred under the control of the main ECU 210, but this invention is not limited to this. The abnormality diagnostic data for an abnormal event which has occurred under the control of the brake ECU 220 may be stored in the brake ECU 220, or the abnormality diagnostic data of an abnormal event which has occurred under the control of the battery ECU 230 or the engine ECU 240 may be stored therein, respectively.

E-3. Modification 3:

In the above embodiment, when the PID from the diag tester is "0", the first eight bytes of data is read, and when the PID is "1", next eight bytes of data is read. This is only one example, and the relation of data to be read out with the PID is not limited to this. That is, when the PID is designated from the diag tester, it is possible to arbitrarily set, as necessary, how many bytes of what type of data should be read out.

In the above embodiment, a desired freeze-frame data is read out by designating the PID and the frame number, but this is only one example, and a desired freeze-frame data may be read out by using another parameter.

E-4. Modification 4:

In the above embodiment, there was described a so-called mechanically distributing type hybrid vehicle in which the motor MG1 and the planetary gear are used as a power adjusting apparatus, and the power of the engine is distributed to the axle and the first motor MG1. The invention can also be applied to a so-called electrically distributing type hybrid vehicle in which the planetary gear is not used as a power adjusting apparatus, and the power of the engine is electrically distributed. In this case, the motor MG1 includes, in addition to an inner rotor which is a common rotor, a rotatable outer rotor instead of a stator fixed to a case so as to be of a paired rotor construction. Since such an electrically distributing type hybrid vehicle is disclosed in Japanese Patent Application Laid-Open Publication No. HEI 9-46965 disclosed by the present applicant, a detailed description thereof is omitted here.

The invention can also be applied to various mobile bodies such as normal gasoline vehicles, diesel vehicles, methanol vehicles, electric vehicles, two-wheeled vehicles, airplanes and boats, in addition to hybrid vehicles. The invention can also be used for controlling a body other than a mobile body.

What is claimed is:

1. An abnormality diagnostic system capable of storing on a vehicle abnormality diagnostic data corresponding to an abnormal event detected in the vehicle, comprising:

a common data storing section for storing, as the abnormality diagnostic data for a plurality of abnormal events, common data which is common against all abnormal events irrespective of the detected abnormal event; and an inherent data storing section for storing in correspondence to the common data inherent data which is associated with and specific to a diagnostic code for the abnormal event detected, said inherent data comprising data whose selection is determined in advance in correspondence to the abnormal event detected.

2. An abnormality diagnostic system according to claim 1, further comprising:

storing means for storing the abnormality diagnosis data;

abnormality judging means for judging an abnormal event when the abnormality is detected;

selecting means for selecting the inherent data corresponding to the judged abnormal event; and writing means for writing the selected inherent data together with the common data to the storing means as the abnormality diagnostic data corresponding to the abnormal event.

3. An abnormality diagnostic system according to claim 2, wherein the common data includes data indicative of behavior of the vehicle.

4. An abnormality diagnostic system according to claim 2, wherein a data length of the inherent data is constant irrespective of a difference in the abnormal events.

5. An abnormality diagnostic system according to claim 2, wherein the inherent data includes a plurality of data, and a data length of each data is constant.

6. An abnormality diagnostic system according to claim 2, wherein the storing means includes a common storing region in which each of the inherent data can be commonly stored, and wherein the writing means writes the inherent data to the common storing region.

7. An abnormality diagnostic system according to claim 6, wherein the common data includes data indicative of a behavior of the vehicle.

8. An abnormality diagnostic system according to claim 6, wherein a data length of the inherent data is constant irrespective of a difference in the abnormal events.

9. An abnormality diagnostic system according to claim 6, wherein the inherent data includes a plurality of data, and a data length of each data is constant.

10. An abnormality diagnostic system according to claim 1, wherein the common data includes data indicative of a behavior of the vehicle.

11. An abnormality diagnostic system according to claim 10, wherein a data length of the inherent data is constant irrespective of a difference in the abnormal events.

12. An abnormality diagnostic system according to claim 10, wherein the inherent data includes a plurality of data, and a data length of each data is constant.

13. An abnormality diagnostic system according to claim 1, wherein a data length of the inherent data is constant irrespective of a difference in the abnormal events.

14. An abnormality diagnostic system according to claim 13, wherein the inherent data includes a plurality of data, and the data length of each data is constant.

15. An abnormality diagnostic system according to claim 1, wherein the inherent data includes a plurality of data, and a data length of each data is constant.

16. An abnormality diagnostic system according to claim 1, wherein the common data and the inherent data corresponding to detected abnormal events are stored in the common data storing section and the inherent data storing section respectively, as long as there are unused memory locations in the common data storing section and the inherent data storing section.

17. An abnormality diagnostic system according to claim 1, wherein the common data and the inherent data corresponding to a first abnormal event are stored in a first memory area which is different from a second memory area in which the common data and the inherent data corresponding to a second abnormal event are stored.

18. An abnormality diagnostic system according to claim 1, wherein the common data and inherent data corresponding to successively occurring and substantially same abnormal events, are stored in the common data and inherent data storing section for each of the substantially same abnormal events.

19. An abnormality diagnostic system according to claim 1, wherein the common data includes data indicative of a behavior of the vehicle, and wherein the inherent data includes data of a component which relates to the abnormal event.

20. An abnormality diagnostic system according to claim 1, wherein the inherent data includes data of a component which relates to the abnormal event.

21. An abnormality diagnostic system according to claim 1, wherein the inherent data and common data corresponding to successively detected abnormal events are stored in an order in which the abnormal events are detected.

22. An abnormality diagnostic system according to claim 1, wherein in addition to storing the inherent data corresponding to abnormalities in an order in which the abnormal events are detected, numbers or symbols corresponding to the order are also stored together with a diagnostic code and freeze-frame data as the inherent data.

23. An abnormality diagnostic data storing method for storing on a vehicle, in a memory, abnormality diagnostic data corresponding to an abnormal event detected in the vehicle, comprising:

judging an abnormal event when an abnormality is detected;

selecting at least inherent data which is associated with the abnormal event;

storing selected inherent data in the memory as abnormality diagnostic data corresponding to the abnormal event for a plurality of abnormal events; and storing said selected inherent data in correspondence to common data which is common against all abnormal events irrespective of the detected abnormal event, the selected inherent data associated with and specific to a diagnostic code for the abnormal event detected, said inherent data comprising data whose selection is determined in advance in correspondence to the abnormal event detected.

24. An abnormality diagnostic data storing method according to claim 23, wherein the common data includes data indicative of behavior of the vehicle.

25. An abnormality diagnostic data storing method according to claim 23, wherein a data length of the inherent data is constant irrespective of a difference in the abnormal events.

26. An abnormality diagnostic data storing method according to claim 23, wherein the inherent data includes a plurality of data, and a data length of each data is constant.

27. An abnormality diagnostic system capable of storing on a vehicle abnormality diagnostic data corresponding to an abnormal event detected in the vehicle, comprising:

a processor configured to identify the detected abnormal event with a diagnostic code;

a common data storing section configured to store, as the abnormality diagnostic data for a plurality of abnormal events, common data which is common against all abnormal events irrespective of the detected abnormal event; and an inherent data storing section configured to store, in correspondence to the common data, data selectively obtained in accordance with the diagnostic code, the data being identified as inherent data associated with and specific to a diagnostic code for the detected abnormal event, said inherent data comprising data whose selection is determined in advance in correspondence to the detected abnormal event.

28. An abnormality diagnostic data storing method for storing on a vehicle, in a memory, abnormality diagnostic data corresponding to an abnormal event detected in the vehicle, comprising:

identifying a detected abnormal event with a corresponding diagnostic code;

selecting, based on the diagnostic code corresponding to the detected abnormal event, at least inherent data which is associated with the detected abnormal event;

storing the selected inherent data in the memory as abnormality diagnostic data corresponding to the detected abnormal event for a plurality of abnormal events; and storing, together with said abnormality diagnostic data, in correspondence to the inherent data common data which is common against all abnormal events irrespective of the detected abnormal event, said inherent data comprising data whose selection is determined in advance in correspondence to the detected abnormal event.

29. An abnormality diagnostic system capable of storing on a vehicle abnormality diagnostic data corresponding to an abnormal event detected in the vehicle, comprising:

a common data storing means for storing, as the abnormality diagnostic data for a plurality of abnormal events, common data which is common irrespective of the detected abnormal event and which includes data indicative of behavior of the vehicle; and an inherent data storing means for storing in correspondence to the common data inherent data which is associated with and specific to a diagnostic code for the abnormal event detected and includes data of a component which relates to the detected abnormal event, said inherent data comprising data whose selection is determined in advance in correspondence to the detected abnormal event.

30. An abnormality diagnostic system capable of storing on a vehicle abnormality diagnostic data corresponding to an abnormal event detected in the vehicle, comprising:

a common data storing section configured to store, as the abnormality diagnostic data for a plurality of abnormal events, common data which is common against all abnormal events irrespective of the detected abnormal event; and an inherent data storing section configured to store in correspondence to the common data inherent data which is associated with and specific to a diagnostic code for the detected abnormal event, said inherent data comprising data whose selection is determined in advance in correspondence to the detected abnormal event.

31. An abnormality diagnostic system according to claim 30, further comprising:

a memory configured to store the abnormality diagnostic data;

a processor configured to judge an abnormal event when an abnormality is detected;

a selecting unit configured to select the inherent data corresponding to the judged abnormal event; and a writing unit configured to write the selected inherent data together with the common data to the memory as the abnormality diagnostic data corresponding to the abnormal event.

32. An abnormality diagnostic system according to claim 31, wherein the common data includes data indicative of a behavior of the vehicle.

33. An abnormality diagnostic system according to claim 31, wherein a data length of the inherent data is constant irrespective of a difference in the abnormal events.

34. An abnormality diagnostic system according to claim 31, wherein the inherent data includes a plurality of data, and a data length of each data is constant.

35. An abnormality diagnostic system according to claim 31, wherein the memory includes a common storing region in which each of the inherent data can be commonly stored, and wherein the writing unit writes the inherent data to the common storing region.

36. An abnormality diagnostic system according to claim 35, wherein the common data includes data indicative of a behavior of the vehicle.

37. An abnormality diagnostic system according to claim 35, wherein a data length of the inherent data is constant irrespective of a difference in the abnormal events.

38. An abnormality diagnostic system according to claim 35, wherein the inherent data includes a plurality of data, and a data length of each data is constant.

39. An abnormality diagnostic system according to claim 30, wherein the common data includes data indicative of a behavior of the vehicle.

40. An abnormality diagnostic system according to claim 39, wherein a data length of the inherent data is constant irrespective of a difference in the abnormal events.

41. An abnormality diagnostic system according to claim 39, wherein the inherent data includes a plurality of data, and a data length of each data is constant.

42. An abnormality diagnostic system according to claim 30, wherein a data length of the inherent data is constant irrespective of a difference in the abnormal events.

43. An abnormality diagnostic system according to claim 42, wherein the inherent data includes a plurality of data, and the data length of each data is constant.

44. An abnormality diagnostic system according to claim 30, wherein the inherent data includes a plurality of data, and a data length of each data is constant.

45. An abnormality diagnostic system according to claim 30, wherein the common data and the inherent data corresponding to detected abnormal events are stored in the common data storing section and the inherent data storing section respectively, as long as there are unused memory locations in the common data storing section and the inherent data storing section.

46. An abnormality diagnostic system according to claim 30, wherein the common data and the inherent data corresponding to a first abnormal event are stored in a first memory area which is different from a second memory area in which the common data and the inherent data corresponding to a second abnormal event are stored.

47. An abnormality diagnostic system according to claim 30, wherein the common data and inherent data corresponding to successively occurring and substantially same abnormal events, are stored in the common data storing section and inherent data storing section for each of the substantially same abnormal events.

48. An abnormality diagnostic system according to claim 30, wherein the common data includes data indicative of a behavior of the vehicle, and wherein the inherent data includes data of a component which relates to the abnormal event.

49. An abnormality diagnostic system according to claim 30, wherein the inherent data includes data of a component which relates to the abnormal event.

50. An abnormality diagnostic system according to claim 30, wherein the inherent data and common data corresponding to successively detected abnormal events are stored in an order in which the abnormal events are detected.

51. An abnormality diagnostic system according to claim 30, wherein in addition to storing the inherent data corresponding to abnormalities in an order in which the abnormalities are detected, numbers or symbols corresponding to the order are also stored together with a diagnostic code and a freeze-frame data as the inherent data.

* * * * *